US012804471B2

(12) United States Patent
Ronkainen et al.

(10) Patent No.: US 12,804,471 B2

(45) Date of Patent: Nov. 17, 2026

(54) HANDLING OF COMMUNICATION INTERRUPTION

(71) Applicant: Telefonaktiebolaget LM Ericsson (publ), Stockholm (SE)

(72) Inventors: Henrik Ronkainen, Södra Sandby (SE); Torbjörn Sölve, Malmö (SE); Emma Wittenmark, Lund (SE); Johan Strand, Staffanstorp (SE); Christer Östberg, Staffanstorp (SE); Kjell Gustafsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 375 days.

(21) Appl. No.: 18/033,646

(22) PCT Filed: Nov. 3, 2020

(86) PCT No.: PCT/EP2020/080818

§ 371 (c)(1),
(2) Date: Apr. 25, 2023

(87) PCT Pub. No.: WO2022/096080

PCT Pub. Date: May 12, 2022

(65) Prior Publication Data

US 2023/0397053 A1 Dec. 7, 2023

(51) Int. Cl.

*H04W 36/22* (2009.01)
*H04W 28/22* (2009.01)
*H04W 36/36* (2009.01)

(52) U.S. Cl.

CPC ......... *H04W 28/22* (2013.01); *H04W 36/362* (2023.05)

(58) Field of Classification Search

CPC ... H04W 36/362; H04W 36/22; H04W 28/22; H04W 36/0094; H04W 36/20
See application file for complete search history.

(56) References Cited

U.S. PATENT DOCUMENTS

| | | | |
|---|---|---|---|
| 1,059,278 | A | 4/1913 | Coston |
| 9,271,212 | B1 | 2/2016 | Pei |

(Continued)

FOREIGN PATENT DOCUMENTS

| | | | |
|---|---|---|---|
| GB | 2399989 | A | 9/2004 |
| WO | 2019240770 | A1 | 12/2019 |

OTHER PUBLICATIONS

International Search Report and Written Opinion of the International Searching Authority, PCT/EP2020/068581, mailed Mar. 30, 2021, 12 pages.

(Continued)

*Primary Examiner* — Anez C Ebrahim
(74) *Attorney, Agent, or Firm* — Sage Patent Group

(57) ABSTRACT

A method is disclosed for a radio access network control node operating in a communication network having an associated user device, wherein the user device has an ongoing application service session with an application server via the communication network.
The method includes detecting that a trigger condition is met for the user device, the trigger condition indicating an upcoming communication interruption in relation to the application service session.
The method also includes causing implementation of a temporary transmission rate adjustment of the application service session, wherein the temporary transmission rate adjustment provides a radio access channel margin accommodating the upcoming communication interruption.
In some embodiments, causing implementation of the temporary transmission rate adjustment includes transmitting an adjustment command to the user device and/or the application server.
Corresponding methods for a user device and an application server are also disclosed.

18 Claims, 6 Drawing Sheets

(56) References Cited

U.S. PATENT DOCUMENTS

| | | | |
|---|---|---|---|
| 10,592,578 B1 | 3/2020 | Mokashi et al. | |
| 11,228,516 B1 | 1/2022 | Harwani et al. | |
| 11,659,444 B1 | 5/2023 | Xing et al. | |
| 2006/0135074 A1* | 6/2006 | Petrovic | H04W 48/16 455/67.13 |
| 2010/0039938 A1 | 2/2010 | Sagfors | |
| 2011/0044262 A1 | 2/2011 | Satapathy et al. | |
| 2011/0159801 A1* | 6/2011 | Maltsev | H04W 52/36 455/7 |
| 2011/0199934 A1 | 8/2011 | Olofsson et al. | |
| 2012/0069756 A1 | 3/2012 | Ji et al. | |
| 2012/0115541 A1 | 5/2012 | Suga et al. | |
| 2012/0238272 A1 | 9/2012 | Hwang et al. | |
| 2013/0065632 A1 | 3/2013 | Macias et al. | |
| 2013/0223222 A1 | 8/2013 | Kotecha et al. | |
| 2014/0355428 A1 | 12/2014 | Smith et al. | |
| 2015/0310234 A1 | 10/2015 | Janssens | |
| 2015/0341411 A1* | 11/2015 | Huber | H04N 21/23439 709/231 |
| 2015/0341832 A1 | 11/2015 | Hwang et al. | |
| 2016/0065447 A1 | 3/2016 | Khan et al. | |
| 2016/0212674 A1 | 7/2016 | Nakamura et al. | |
| 2016/0302128 A1 | 10/2016 | Anchan | |
| 2018/0115392 A1 | 4/2018 | Yang et al. | |
| 2018/0242191 A1 | 8/2018 | Lundqvist et al. | |
| 2018/0288641 A1 | 10/2018 | Mildh et al. | |
| 2019/0014050 A1 | 1/2019 | Wang et al. | |
| 2019/0158371 A1 | 5/2019 | Dillon et al. | |
| 2019/0254088 A1 | 8/2019 | Park et al. | |
| 2019/0313317 A1 | 10/2019 | Murphy | |
| 2020/0015121 A1 | 1/2020 | Misra et al. | |
| 2020/0053018 A1 | 2/2020 | White et al. | |
| 2020/0084142 A1 | 3/2020 | Bochkar et al. | |
| 2020/0120036 A1 | 4/2020 | Zhou et al. | |
| 2020/0170052 A1 | 5/2020 | Yang et al. | |
| 2020/0195539 A1 | 6/2020 | Sivaraj et al. | |
| 2020/0296632 A1 | 9/2020 | Pudukoli Subrahmanya et al. | |
| 2020/0336945 A1 | 10/2020 | Gapin et al. | |
| 2020/0396713 A1* | 12/2020 | Ananda | H04W 76/28 |
| 2021/0037544 A1 | 2/2021 | Andrews et al. | |
| 2021/0112006 A1 | 4/2021 | Francini et al. | |
| 2022/0417166 A1 | 12/2022 | Sivaraj et al. | |
| 2023/0247500 A1 | 8/2023 | Östberg et al. | |
| 2023/0397053 A1 | 12/2023 | Ronkainen et al. | |
| 2024/0323132 A1 | 9/2024 | Gilson et al. | |
| 2025/0184813 A1 | 6/2025 | Pan et al. | |
| 2026/0052465 A1 | 2/2026 | Rodrigo et al. | |

OTHER PUBLICATIONS

International Search Report and Written Opinion of the International Searching Authority, PCT/EP2020/068582, mailed Mar. 29, 2021, 11 pages.

International Search Report and Written Opinion of the International Searching Authority, PCT/EP2020/068577, mailed Mar. 24, 2021, 13 pages.

International Search Report and Written Opinion of the International Searching Authority, PCT/EP2020/068578, mailed Mar. 15, 2021, 9 pages.

International Search Report and Written Opinion of the International Searching Authority, PCT/EP2020/068580, mailed Mar. 24, 2021, 18 pages.

International Search Report and Written Opinion of the International Searching Authority, PCT/EP2020/080818, mailed Aug. 20, 2021, 10 pages.

Spreadtrum Communications, "Handling of collision involving measurement gap," 3GPP TSG-RAN WG2 Meeting #110 electronic, R2-2005051, Online, Jun. 1-12, 2020, 3 pages.

3GPP TSG-RAN WG2 #103-bis, Tdoc R2-1912357, Chongqing, China, Oct. 14-18, 2019, Agenda Item 7.3.2.1.1, Ericsson, "Handover Interruption Reduction for UM Bearers," (XP051803851) 4 pages.

Kumar, R., et al., "Design of an Enhanced Bearer Buffer for Latency Minimization in the Mobile RAN," 2019 IEEE Global Communications Conference (BLOBECOM) Dec. 9, 2019 (XP033722312) 6 pages.

De Schepper, K., et al., Identifying Modified Explicit Congestion Notification (ECN) Semantics for Ultra-Low Queuing Delay (L4S) Mar. 9, 2020 (XP015138622) 45 pages.

Briscoe, B., Ed., et al., "Low Latency, Low Loss, Scalable Throughput (L4S) Internet Service: Architecture," Transport Area Working Group, Internet Draft, draft-ietf-tsvwg-14s-arch-06, Mar. 9, 2020, 29 pages.

Le Boudec, J-Y, "Rate adaptation, Congestion Control and Fairness: A Tutorial," Ecole Polytechnique Fédérale de Lausanne (EPFL), Sep. 12, 2014, 45 pages.

Molisch, A., "Wireless Communications," Wireless Communications, Second Edition, © 2011 John Wiley & Sons Ltd., 884 pages.

* cited by examiner

HANDLING OF COMMUNICATION INTERRUPTION

CROSS REFERENCE TO RELATED APPLICATIONS

This application is a 35 U.S.C. § 371 national stage application of PCT International Application No. PCT/EP2020/080818 filed on Nov. 3, 2020, the disclosure and content of which is incorporated by reference herein in its entirety.

TECHNICAL FIELD

The present disclosure relates generally to the field of wireless communication. More particularly, it relates to approaches to accommodate communication interruptions; e.g., for latency control in wireless communication scenarios.

BACKGROUND

Communication interruptions may occur in wireless communication systems for various reasons. One example of a communication interruption is a measurement gap enabling a user device to perform measurements in relation to frequency bands not currently used for communication with the user device.

Communication interruptions may affect the latency of wireless communication. Different forms of latency control are generally applied in wireless communication scenarios. In some situations, existing approaches for latency control do not provide for desirable performance.

Therefore, there is a need for alternative approaches for latency control in relation to communication interruptions; or—more generally—there is a need for approaches to handling of communication interruptions.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

A first aspect is a method for a radio access network control node operating in a communication network having an associated user device, wherein the user device has an ongoing application service session with an application server via the communication network. The method comprises detecting that a trigger condition is met for the user device, the trigger condition indicating an upcoming communication interruption in relation to the application service session, and causing implementation of a temporary transmission rate adjustment of the application service session, wherein the temporary transmission rate adjustment provides a radio access channel margin accommodating the upcoming communication interruption.

In some embodiments, the application service session comprises a frame structure according to which a predetermined plurality of packets is transmitted within each frame, and wherein implementation of the temporary transmission rate adjustment comprises one or more of: decreasing a frame rate, and increasing an in-frame packet rate.

In some embodiments, decreasing the frame rate comprises decreasing a quality of the application service.

In some embodiments, the communication interruption is a measurement gap for the user device to perform inter-frequency measurements.

In some embodiments, detecting that the trigger condition is met comprises one or more of: receiving a signal indicative of the upcoming communication interruption, and determining a need for the upcoming communication interruption.

In some embodiments, the method further comprises causing transmission rate restoration after the communication interruption.

In some embodiments, causing implementation of the temporary transmission rate adjustment comprises transmitting an adjustment command to the user device and/or the application server.

In some embodiments, the method further comprises determining whether the transmission rate adjustment meets an accommodation criterion relative the upcoming communication interruption, wherein causing the transmission rate adjustment is responsive to the accommodation criterion being met, and cancelling the upcoming communication interruption when the accommodation criterion is not met.

In some embodiments, the user device and one or more other user devices are served by a same cell, and the method further comprises causing handover of at least one of the other user devices when the cell has a load which exceeds a threshold value.

In some embodiments, the application service session is a real-time streaming application.

In some embodiments, the method further comprises identifying that the application service session is for a service wherein a deviation between a latency requirement of the service and an internal latency performance of the communication network is bounded.

In some embodiments, identifying that the application service session—for a service wherein the deviation between the latency requirement of the service and the internal latency performance of the communication network is bounded—is currently associated with the user device comprises one or more of: detecting that a service class identifier is indicative of the service, detecting that a bearer dedicated for low latency requirements is assigned for the service, and determining that a traffic pattern of the service matches a latency sensitive traffic pattern.

In some embodiments, the bounded deviation between the latency requirement of the service and the internal latency performance of the communication network comprises one or more of: a ratio between a latency requirement parameter value of the service and an internal latency performance parameter value of the communication network not exceeding a bounding threshold, a latency requirement parameter value of the service and an internal latency performance parameter value of the communication network being in a same order of magnitude, a latency requirement parameter value of the service and an internal latency performance parameter value of the communication network being equal, and a required end-to-end round-trip-time of the service falling within a time range specified relative an internal round-trip-time of the communication network.

In some embodiments, the service has a maximum allowable latency which is lower than that of mobile broadband, MBB, services and/or higher than that of ultra-reliable low latency communication, URLLC, services.

A second aspect is a method for a radio access network control node operating in a communication network having an associated user device, wherein the user device has an ongoing application service session with an application server via the communication network. The method comprises detecting that a trigger condition is met for the user device, the trigger condition indicating an upcoming communication interruption in relation to the application service session, and cancelling the upcoming communication interruption.

A third aspect is a method for a user device having an ongoing application service session with an application server via a communication network. The method comprises receiving a user device adjustment command from the application server or a radio access network control node operating in the communication network, wherein the user device adjustment command is indicative of a trigger condition being met for the user device, the trigger condition indicating an upcoming communication interruption in relation to the application service session, and causing implementation of a temporary transmission rate adjustment of the application service session, wherein the temporary transmission rate adjustment provides a radio access channel margin accommodating the upcoming communication interruption.

In some embodiments, causing implementation of the temporary transmission rate adjustment comprises transmitting an application server adjustment command to the application server.

A fourth aspect is a method for an application server having an ongoing application service session with a user device via a communication network. The method comprises receiving an application server adjustment command from the user device or a radio access network control node operating in the communication network, wherein the application server adjustment command is indicative of a trigger condition being met for the user device, the trigger condition indicating an upcoming communication interruption in relation to the application service session, and implementing a temporary transmission rate adjustment of the application service session, wherein the temporary transmission rate adjustment provides a radio access channel margin accommodating the upcoming communication interruption.

A fifth aspect is a computer program product comprising a non-transitory computer readable medium, having thereon a computer program comprising program instructions. The computer program is loadable into a data processing unit and configured to cause execution of the method according to any of the first, second, third, and fourth aspects when the computer program is run by the data processing unit.

A sixth aspect is an apparatus for a radio access network control node operating in a communication network having an associated user device, wherein the user device has an ongoing application service session with an application server via the communication network. The apparatus comprises controlling circuitry configured to cause detection of that a trigger condition is met for the user device, the trigger condition indicating an upcoming communication interruption in relation to the application service session, and implementation of a temporary transmission rate adjustment of the application service session, wherein the temporary transmission rate adjustment provides a radio access channel margin accommodating the upcoming communication interruption.

A seventh aspect is an apparatus for a radio access network control node operating in a communication network having an associated user device, wherein the user device has an ongoing application service session with an application server via the communication network. The apparatus comprises controlling circuitry configured to cause detection of that a trigger condition is met for the user device, the trigger condition indicating an upcoming communication interruption in relation to the application service session, and cancelling of the upcoming communication interruption.

An eighth aspect is a radio access network control node comprising the apparatus of any of the sixth and seventh aspects.

A ninth aspect is an apparatus for a user device having an ongoing application service session with an application server via a communication network. The apparatus comprises controlling circuitry configured to cause reception of a user device adjustment command from the application server or a radio access network control node operating in the communication network, wherein the user device adjustment command is indicative of a trigger condition being met for the user device, the trigger condition indicating an upcoming communication interruption in relation to the application service session, and implementation of a temporary transmission rate adjustment of the application service session, wherein the temporary transmission rate adjustment provides a radio access channel margin accommodating the upcoming communication interruption.

A tenth aspect is a user device comprising the apparatus of any of the ninth aspect.

An eleventh aspect is an apparatus for an application server having an ongoing application service session with a user device via a communication network. The apparatus comprises controlling circuitry configured to cause reception of an application server adjustment command from the user device or a radio access network control node operating in the communication network, wherein the application server adjustment command is indicative of a trigger condition being met for the user device, the trigger condition indicating an upcoming communication interruption in relation to the application service session, and implementation of a temporary transmission rate adjustment of the application service session, wherein the temporary transmission rate adjustment provides a radio access channel margin accommodating the upcoming communication interruption.

A twelfth aspect is an application server comprising the apparatus of the eleventh aspect.

In some embodiments, any of the above aspects may additionally have features identical with or corresponding to any of the various features as explained above for any of the other aspects.

An advantage of some embodiments is that approaches to handling of communication interruptions are provided.

An advantage of some embodiments is that alternative approaches for latency control are provided; particularly suitable in relation to communication interruptions. Generally, the alternative approaches for latency control may be used instead of, or together with, other approaches for latency control, as suitable.

An advantage of some embodiments is that the probability of occurrences with relatively large latency (e.g., latency spikes) may be reduced.

An advantage of some embodiments is that the latency variance may be reduced.

An advantage of some embodiments is that accommodation of latency variations of a communication network is enabled, under the constraint of latency requirements on communication between end points of a service.

An advantage of some embodiments is that provision of a real-time service is robust in the presence of communication interruptions.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

DETAILED DESCRIPTION

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Figure 1:
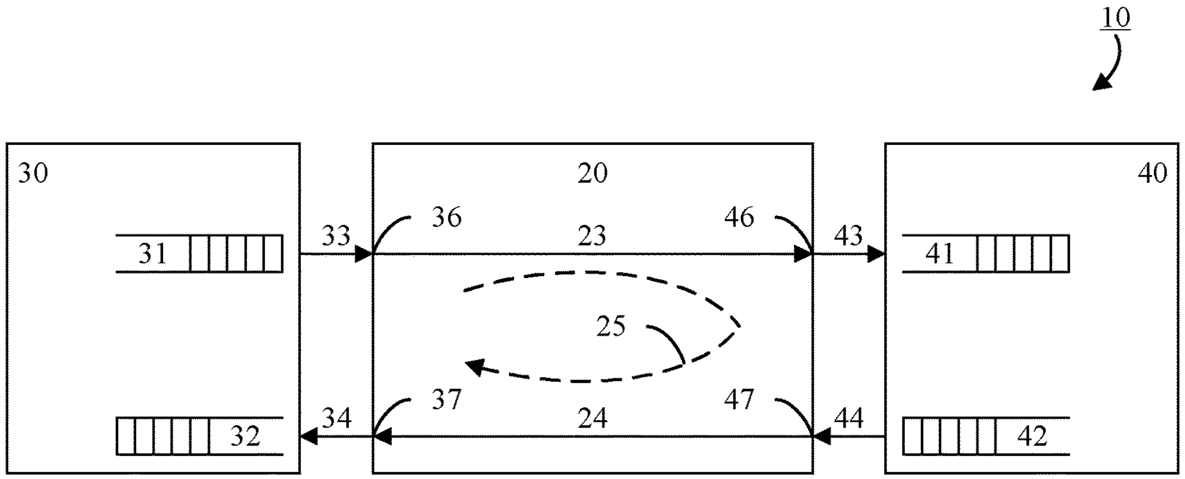
FIG. 1 is a schematic block diagram illustrates an example communication scenario according to some embodiments.

As mentioned before, different forms of latency control are generally applied in wireless communication scenarios. FIG. 1 schematically illustrates a communication scenario 10 for demonstrating a type of situation where latency control may be challenging.

The communication scenario 10 comprises two communication end points 30, 40 and a communication network 20. The communication network 20 is for carrying information (e.g., data and/or control information) from end point 30 to end point 40 as illustrated by 33, 23, and 43 and/or from end point 40 to end point 30 as illustrated by 44, 24, and 34.

The end points 30, 40 may be any suitable communication end points. One example of a communication end point pair is an application client-server pair.

Depending on the type of service the end points 30, 40 are engaged in, there may be different latency requirements on the communication between the end points 30, 40.

Generally, latency of communication between the end points 30, 40 may be defined as one or more of: a time for transfer of information from end point 30 to end point 40 (possibly defined as a time between information entering a transmission buffer 31 associated with the end point 30 and the same information being dispatched from a reception buffer 41 associated with the end point 40), a time for transfer of information from end point 40 to end point 30 (possibly defined as a time between information entering a transmission buffer 42 associated with the end point 40 and the same information being dispatched from a reception buffer 32 associated with the end point 30), a time from issuing of first information at end point 30 (possibly defined as a time when the first information enters a transmission buffer 31 associated with the end point 30) to reception of second information at end point 30 (possibly defined as a time when the second information is dispatched from a reception buffer 32 associated with the end point 30) wherein the second information is issued by end point 40 in response to reception of the first information, and a time from issuing of first information at end point 40 (possibly defined as a time when the first information enters a transmission buffer 42 associated with the end point 40) to reception of second information at end point 40 (possibly defined as a time when the second information is dispatched from a reception buffer 41 associated with the end point 40) wherein the second information is issued by end point 30 in response to reception of the first information.

Alternatively or additionally, and generally, latency of communication between end points may be characterized by one or more of: an average duration of end point to end point transfer, a minimum duration of end point to end point transfer, a maximum duration of end point to end point transfer, a variance of the duration of end point to end point transfer, and a probability that duration of end point to end point transfer exceeds a duration threshold.

Generally, end point to end point transfer may refer to a one way transfer or to a round-trip-time (RTT).

The latency requirements on the communication between the end points may be defined according to any of the above, or other suitable, definitions and characterization. For example, a specific service may require that the time from issuing of first information at end point 30 to reception of second information at end point 30 (wherein the second information is issued by end point 40 in response to reception of the first information) is below a maximum duration value and/or has a variance below a maximum variance value.

The communication network 20 may be any suitable communication network. One example of a communication network is any wireless communication network operating in accordance with a standard advocated by the third generation partnership project (3GPP); e.g., the universal mobile telecommunication system (UMTS), UMTS long term evolution (LTE), or a fifth generation (5G) system. The communication network may, for example, comprise a radio access network (RAN) and/or a core network (CN).

The communication network 20 typically has an internal latency performance, schematically illustrated by 25.

The internal latency performance 25 of the communication network 20 determines (e.g., limits) how quickly information delivered to the communication network at 36 can be transferred through the communication network over 23 and provided at 46 and/or how quickly information delivered to the communication network at 47 can be transferred through the communication network over 24 and provided at 37.

The internal latency performance 25 of the communication network 20 may be characterized in terms of the duration (delay) of the transfer over 23 and/or 24. For example, the internal latency performance 25 of the communication network 20 may be characterized by one or more of: an average duration of transfer through the communication network, a minimum duration of transfer through the communication network, a maximum duration of transfer through the communication network, a variance of the duration of transfer through the communication network, and a probability that duration of transfer through the communication network exceeds a duration threshold.

Generally, transfer through the communication network may refer to a one way transfer or to a round-trip-time (RTT).

The internal latency performance 25 of the communication network 20 may be caused by one or more of various (standardized or non-standardized) settings and limitations of the communication network. Some example settings and limitations of a communication network that inherently introduce latency include—but are not limited to—standardized time domain dimensions of communication resources (e.g., time duration of one or more units for communication), scheduling principles, protocols (e.g., retransmission protocols such as hybrid automatic repeat request—HARQ), and response requirements (e.g., for acknowledgement—ACK).

When the latency requirements on the communication between the end points are easily accommodated by the internal latency performance of the communication network, the end-to-end communication scenario is unproblematic from a latency perspective.

Such situations may, for example, occur when an average duration of transfer through the communication network is much lower than a required average duration of end point to end point transfer, when a maximum duration of transfer through the communication network is much lower than a required maximum (or average) duration of end point to end point transfer, and/or when a variance of duration of transfer through the communication network is much lower than a required maximum variance of duration of end point to end point transfer.

When the latency requirements on the communication between the end points are impossible to fully accommodate by the internal latency performance of the communication network, the end-to-end communication scenario is infeasible from a latency perspective.

Such situations may, for example, occur when an average duration of transfer through the communication network is much higher than a required average duration of end point to end point transfer, when a minimum duration of transfer through the communication network is higher than a required minimum (or average) duration of end point to end point transfer, and/or when a variance of duration of transfer through the communication network is higher than a required maximum variance of duration of end point to end point transfer.

These problems may be solved by application of a different communication network, or a specifically designed communication type within the communication network, to accommodate the latency requirements on the communication between the end points.

Embodiments presented herein are particularly applicable in situations which are neither of the above, i.e., situations when the latency requirements on the communication between the end points are not impossible, but not easy either, to accommodate by the internal latency performance of the communication network. Then, the end-to-end communication scenario is feasible, but problematic (e.g., presenting challenges), from a latency perspective. This may be seen as the end-to-end communication scenario comprising a service which is latency sensitive (i.e., with latency requirements on the communication between the end points) in relation to the internal latency performance of the communication network (i.e., latency sensitive service).

Such situations may, for example, occur when an average duration of transfer through the communication network is similar to a required average duration of end point to end point transfer, when a maximum duration of transfer through the communication network is similar to a required maximum duration of end point to end point transfer, and/or when a variance of duration of transfer through the communication network is similar to a required maximum variance of duration of end point to end point transfer.

Generally, a latency sensitive service associated with a user of a communication network may be defined as a service with latency requirements on the communication between the end points which are similar to the internal latency performance of the communication network.

For example, a latency sensitive service associated with a user of a communication network may be defined as a service with one or more latency requirement parameter value (e.g., average duration of transfer, maximum duration of transfer, variance of transfer duration, etc.) for the communication between the end points being in the same order of magnitude as the value of a corresponding parameter of the internal latency performance of the communication network.

Alternatively or additionally, a latency sensitive service associated with a user of a communication network may be defined as a service with one or more latency requirement parameter value (e.g., average duration of transfer, maximum duration of transfer, variance of transfer duration, etc.) for the communication between the end points deviating from the value of a corresponding, or otherwise relevant, parameter of the internal latency performance of the communication network by less than a threshold value.

Alternatively or additionally, a latency sensitive service associated with a user of a communication network may be defined as a service with a requirement of maximum duration of transfer for the communication between the end points which is lower than a maximum duration of transfer through the communication network.

Alternatively or additionally, a latency sensitive service associated with a user of a communication network may be defined as a service with a requirement of average duration of transfer for the communication between the end points deviates from an average duration of transfer through the communication network by less than a threshold value.

Alternatively or additionally, a latency sensitive service associated with a user of a communication network may be defined as a service with a requirement of variance of duration of transfer for the communication between the end points which is lower than a value based on a variance of duration of transfer through the communication network (e.g., lower than the variance of duration of transfer through the communication network, or lower than the variance of duration of transfer through the communication network plus or minus a bias value).

The problems associated with latency sensitive services may be solved in the same way as situations where the end-to-end communication scenario is infeasible from a latency perspective, i.e., by application of a different communication network, or a specifically designed communication type within the communication network, to more easily accommodate the latency requirements on the communication between the end points. However, application of a communication network (or a specifically designed communication type within a communication network) which accommodates strict latency requirements on the communication between the end points is typically inefficient in terms of throughput and/or capacity. For example, increasing the amount of allocated communication resources is one approach that is helpful to accommodate strict latency requirements on the communication between the end points, but has a negative impact on overall throughput of the communication network.

Therefore, there is a need for alternative approaches for latency control, which preferably address the problems associated with latency sensitive services (i.e., services with a sensitive relationship between latency requirements on the communication between the end points and the internal latency performance of the communication network).

A more detailed context will now be described, in relation to which embodiments may be particularly applicable. It should be noted that the following context is merely an illustrative example and not to be construed as limiting.

Some typical existing wireless communication networks (e.g., 3GPP-based networks supporting fourth generation, 4G, and earlier releases of the communication standard) are mainly optimized for mobile broadband (MBB) services and voice services. Generally, MBB traffic is not particularly latency sensitive but can be very throughput demanding. For example, for streaming services latency is typically handled by using large buffers which will efficiently hide latency jitter caused by latency events in the communication network, and thereby provide good end user experience. This exemplifies situations when the latency requirements on the communication between the end points are easily accommodated by the internal latency performance of the communication network, and the end-to-end communication scenario is unproblematic from a latency perspective.

In later releases of 4G, and especially in 5G, services of other types than MBB and voice have come into focus. One example is ultra-reliable low latency communication (URLLC) services. URLLC may be particularly suitable for industrial applications. Within 3GPP standardization, features are developed to support these new URLLC services and use cases. This exemplifies situations when the latency requirements on the communication between the end points are impossible to fully accommodate by the internal latency performance of the communication network, the end-to-end communication scenario is infeasible from a latency perspective, and a specifically designed communication type within the communication network is applied to accommodate the latency requirements on the communication between the end points.

Embodiments presented herein are particularly applicable in situations which are neither of the above (MBB, voice, and URLLC), i.e., situations when the latency requirements on the communication between the end points are not impossible, but not easy either, to accommodate by the internal latency performance of the communication network (referred to herein as latency sensitive services). In some embodiments, a relatively high throughput is also required (which is typically not the case for services requiring a specifically designed communication type, e.g., URLLC).

Some typical example services where embodiments may be particularly applicable—e.g., in the context of a 3GPP-based communication network—are gaming applications (gaming with or without rendering, and including multi-user gaming), augmented reality (AR), virtual reality (VR), tele-operated vehicle control (e.g., driving), real-time video transfer, and other real-time services.

Generally, the latency through the radio network (RAN), the core network (CN), and all the way to the communication end points (e.g., application client and application server) needs to be considered in view of latency requirements on the communication between the end points. One approach to reduce the impact of CN latency and/or of latency between the communication network and the application server, is to apply an edge cloud deployment of the application.

For situations when the latency requirements on the communication between the end points are not impossible, but not easy either, to accommodate by the internal latency performance of the communication network, some example latency requirements include a maximum round-trip-time (RTT) for communication between end points (end-to-end, E2E, RTT) in any of the ranges 10-100 ms, 30-100 ms, 30-50 ms, and 80-100 ms, and/or some example throughput requirements include a throughput in the range 5-10 Mbps or there over; up to 400 Mbps (e.g., for VR streaming applications).

For situations when the latency requirements on the communication between the end points are not impossible, but not easy either, to accommodate by the internal latency performance of the communication network, it may be further beneficial to consider reliability of the communication (e.g., measured as the probability of delivering traffic within a specified time duration, i.e., fulfilling the latency requirement). The reliability is tightly coupled with the latency requirements (without any latency requirement, the traffic can always be delivered, e.g., by using sufficiently many retransmissions). Thus, reliability is a relevant metric when a communication network is tuned for latency sensitive traffic.

Thus, some communication networks are typically dimensioned and configured to provide services (e.g., for MBB traffic) with high throughput and relatively relaxed latency requirements. Although latency is typically considered in such communication networks (e.g., in relation to transmission control protocol, TCP, throughput and ramp-up times), predictable latency (i.e., low latency variance) is typically not required. One explanation to the latter is that the timing requirements in some human-machine interaction (e.g., web-browsing and video streaming) is quite relaxed and rather large latency variations can be hidden with buffers.

For latency sensitive services, however, extensive use of buffers is not possible due to the nature of the applications (e.g., quick reaction times required for gaming, fast control response required for vehicle tele-operation, etc.). Typically, a latency spike will have negative impact on the application experience/performance for latency sensitive services. Some example events in a communication network that may cause latency spikes include handovers, slow fading dips, and fast fading dips.

In association with some typical communication networks (e.g., 3GPP-based networks for 4G and 5G), efforts are made to reduce overall latency (e.g., reducing the average latency). This, however, does not exclude a relatively large maximum latency and/or a relatively large latency variation (which may result in latency spikes, for example).

Regarding handover, some typical communication networks (e.g., 3GPP-based networks for 4G and 5G) apply a handover mechanism where service by one cell is released before service setup towards a target cell is completed. This mechanism causes a brief communication interruption during the handover procedure. The interruption may, for example, be in the range 30-60 ms, or considerably longer (e.g., up to 100 ms, or up to several hundreds of ms, such as 200 ms, 500 ms, or 900 ms).

For MBB services and voice services, these handover interruptions typically do not negatively affect the quality of the services, since the latency caused by the interrupt can be hidden with buffer management. For latency sensitive services, however, the length of these handover interruptions may be in the same order of magnitude as the latency requirements of the service, and a handover can negatively affect the quality of the service.

Hence, some approaches for latency control may comprise avoiding unnecessary handovers, at least for latency sensitive services, while performing handovers that are necessary to maintain connection between the communication network and a device operating at the communication end point.

Alternatively or additionally, some approaches for latency control may comprise controlling the setting of one or more network configuration parameter, at least for latency sensitive services.

Generally, there are many network configuration parameters that potentially impact the latency of a communication network. Examples include: the scheduling request periodicity (for UE initiated transmissions), the coding and modulation selected for HARQ retransmissions, the maximum number of HARQ retransmissions, timer settings in medium access control (MAC), timer settings in radio link control (RLC).

For MBB services and voice services, the setting of these configuration parameters typically have negligible impact on the user experience, since any un-acceptable latency jitter can be hidden with buffer management. For latency sensitive services, however, the setting of these configuration parameters can have a negative effect on the user experience since they might affect the variation in latency and/or the maximum latency.

Hence, some approaches for latency control may comprise controlling the setting of one or more network configuration parameter, at least for latency sensitive services, to provide latencies which are predictable (i.e., low variation in latency) and relatively low (i.e., low maximum latency).

Generally, some approaches for latency control may comprise keeping latency predictable and relatively low (bounded and predictable), while (preferably) enabling maintenance of the communication connection through the communication network at a predictable throughput. Thereby, latency sensitive services can be satisfactorily supported in the communication network.

Alternatively or additionally, some approaches for latency control may comprise, at least for latency sensitive services, informing the application about current and/or future conditions of the communication network that impact throughput and/or latency.

For example, when the application receives information that the throughput of the communication network throughput is decreasing, or predicted to decrease in a near future, the application can adapt to this situation. Example adaptions by the application include lowering of a data rate (e.g., by lowering an encoder rate, such as a video encoding rate).

Some communication networks already have approaches for differentiating services in RAN, which may be used for differentiation also in relation to latency sensitive services as defined herein. In some embodiments, such approaches may be combined with the alternative approaches for latency control presented herein.

Examples of already existing approaches for differentiating services in RAN include slicing, dedicated bearers, resource assignment differentiation, scheduling prioritization, etc. For example, some legacy solutions allow an operator to assign more or less resources and/or set a priority for a bearer that transport a specific service type (e.g., voice over LTE, VoLTE). Such approaches may comprise assigning different service class identifiers (e.g., quality-of-service class identifier—QCI, 5QI, etc.) to different bearers based on which type of service is carried by the bearer. Alternatively or additionally, some legacy solutions allow an operator to enable different types of services based on which type of subscription is associated with a user device.

Figure 2:
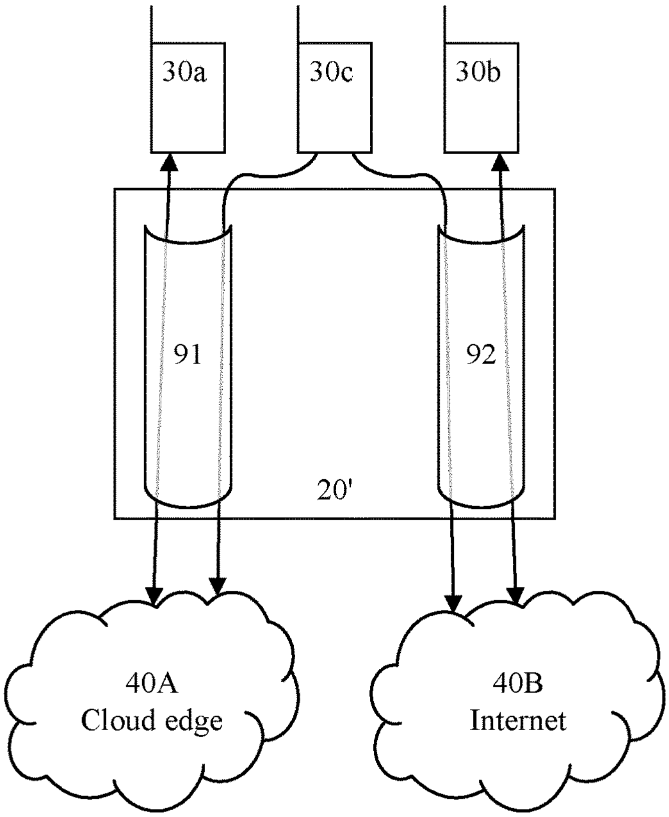
FIG. 2 is a schematic block diagram illustrates an example communication scenario according to some embodiments.

FIG. 2 schematically illustrates a communication scenario with differentiated bearers. The user device 30*a* communicates with an application dwelling in the Internet 40A via the communication network 20', using a bearer 91. The user device 30*b* communicates with an application associated with a latency sensitive service via the communication network 20', using another bearer 92. To reduce end-to-end latency, the application dwells in a cloud edge The user device 30*c* communicates with an application dwelling in the Internet 40A using the bearer 91, as well as with an application associated with a latency sensitive service dwelling in the cloud edge 40B using the bearer 92.

The different bearers 91, 92 may be differentiated to provide different latency characteristics as exemplified above, using any suitable latency approach (e.g., any of the alternative approaches for latency control described herein).

As mentioned above, alternative approaches for latency control are provided by this disclosure. Some embodiments of the approaches for latency control address the problems associated with latency sensitive services (i.e., services with a sensitive relationship between latency requirements on the communication between the end points and the internal latency performance of the communication network).

A possible principle for alternative approaches for latency control is to improve the internal latency performance of the communication network (e.g., decreasing the maximum duration of transfer through the communication network, and/or decreasing the average duration of transfer through the communication network, and/or decreasing the variance of duration of transfer through the communication network, etc.). This may, for example, be achieved by avoiding unnecessary handovers and/or by controlling the setting of one or more network configuration parameter.

Another possible principle for alternative approaches for latency control is to dynamically vary the utilization of the communication network by the service in view of the latency requirements on the communication between the end points. For example, temporarily (when the internal latency performance of the communication network is poor) lowering a communication rate that the service applies in the communication network may temporarily improve the internal latency performance of the communication network (e.g., due to less HARQ retransmissions, etc.) at the cost of reduced throughput. The latter may be mitigated by temporary buffer build-up (compare e.g., with 31 and 42 of FIG. 1) within the boundaries set by latency requirements on the communication between the end points. This may, for example, be achieved by informing the application about current and/or future conditions of the communication network to allow the application to adjust its data rate.

The above possible principles may be used alone or in combination.

In some embodiments, the above possible principles are used exclusively for latency sensitive services, or only for communication end points associated with a latency sensitive service.

In the following, embodiments will be described where alternative approaches for latency control are provided. Some embodiments are particularly suitable for latency control in situations as that described in connection with FIG. 1. Furthermore, some embodiments apply the principle to dynamically vary the utilization of the communication network by the service. This is a form of latency control is also termed latency management, and provides accommodation of latency variations of the communication network.

In some embodiments the dynamic variation of the utilization of the communication network by the service is achieved by lowering a communication rate that the service applies (entailing a quality reduction) and/or by increasing a packet pacing rate within communication frame (thereby spreading the plurality of packets non-uniformly within the communication frame).

Generally, it should be noted that—even though embodiments are exemplified herein in the context of latency control—some embodiments may be equally applicable is any context where communication interruptions need to be handled.

Figure 3A:
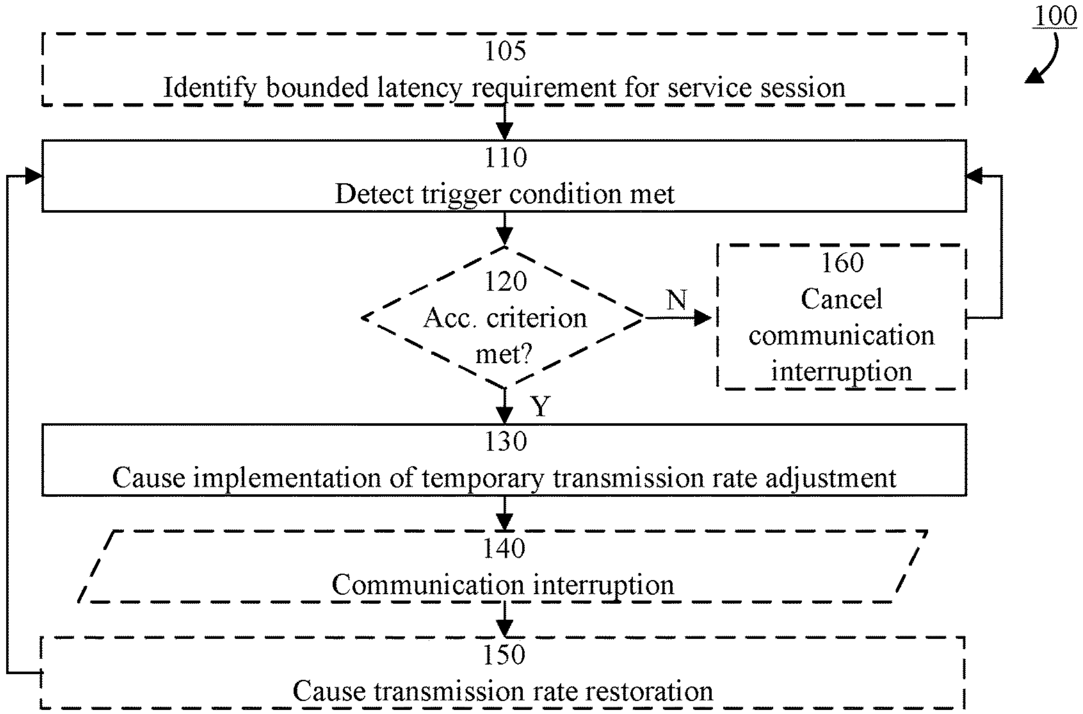
FIG. 3A is a flowchart illustrating example method steps according to some embodiments.

FIG. 3A illustrates an example method 100 according to some embodiments. The method is for a radio access network control node operating in a communication network having an associated (e.g., registered and/or served) user device, wherein the user device has an ongoing application service session with an application server via the communication network. For example, the method may be for handling communication interruptions and/or for latency control in a communication network.

Generally, latency control may refer to one or more of: mitigation of latency spikes, reduction/decrease of latency variance/variation associated with the communication network for the user device, reduction/decrease of average latency associated with the communication network for the user device, reduction/decrease of the probability for (i.e., number—e.g., per time unit—of) latency events associated with the communication network for the user device that exceed a latency threshold value, reduction/decrease of a maximum latency associated with the communication network for the user device, or any other suitable change in latency behavior.

A user device may, for example, comprise one of the communication end points 30, 40 of FIG. 1, one of the user devices 30*a*, 30*b*, 30*c* of FIG. 2, a user equipment (UE), a station (STA), or similar.

Also generally, latency control may be for mitigation of latency variations and/or for providing predictable latency and/or for providing reliable communication.

In typical embodiments, the latency control is performed under a throughput condition (e.g., that throughput should be kept at, or above, a minimum acceptable throughput).

The application service session may be for a service wherein a deviation between a latency requirement of the service and an internal latency performance of the communication network is bounded (e.g., a latency sensitive service), as elaborated on above.

Alternatively or additionally, the application service session may be a real-time streaming application (e.g., a gaming application, an augmented reality application, a virtual reality application, a tele-operated vehicle control application, a real-time video transfer application, etc.).

In typical embodiments, the application service session has a variable transmission rate; dynamically controllable by explicit or implicit commands to the application server and/or to an application client of the user device.

As illustrated by step 110, the method comprises detecting that a trigger condition is met for the user device. The trigger condition indicates an upcoming communication interruption in relation to the application service session. An example of a communication interruption is a measurement gap (e.g., enabling the user device to perform measurements for other frequencies than the frequency currently used for communication; i.e., inter-frequency measurements). Another example of a communication interruption is an interruption due to handover of the user device.

Detecting that the trigger condition is met may be implemented in any suitable way. For example, step 110 may comprise receiving a signal from another node (e.g., from another network node or from the user device) indicating and/or requesting an upcoming communication interruption. Alternatively or additionally, step 110 may comprise determining that there is a need for a communication interruption.

The method also comprises causing implementation of a temporary transmission rate adjustment of the application service session, as illustrated by step 130. Step 130 may be performed in response to step 110 according to some embodiments. The temporary transmission rate adjustment provides a radio access channel margin accommodating the upcoming communication interruption. Thereby, latency control may be achieved.

Causing implementation of the temporary transmission rate adjustment may be implemented in any suitable way. For example, step 130 may comprise transmitting (or cause transmission—from another node—of) a rate adjustment command to the user device and/or the application server.

When the communication interruption—illustrated by optional event 140—has elapsed (i.e., after the communication interruption), the method may comprise causing transmission rate restoration, as illustrated by optional step 150. Transmission rate restoration may, for example, comprise implementing a transmission rate re-adjustment to the transmission rate used before step 110.

Causing transmission rate restoration may be implemented in any suitable way. For example, step 150 may comprise transmitting (or cause transmission—from another node—of) a rate re-adjustment command to the user device and/or the application server.

A determination that the communication interruption has elapsed may be performed using any suitable approach; e.g., based on internal/external measurements and/or based on a timer.

In some embodiments, the method comprises (e.g., directly after step 110) determining whether the (prospect) transmission rate adjustment meets an accommodation criterion relative the upcoming communication interruption, as illustrated by optional step 120.

When the accommodation criterion is met (Y-path out of step 120), the method proceeds to step 130 for causing the temporary transmission rate adjustment; responsive to the accommodation criterion being met. When the accommodation criterion is not met (N-path out of step 120), the method may comprise cancelling the upcoming communication interruption instead of causing the temporary transmission rate adjustment, as illustrated by optional step 160.

The accommodation criterion may be any suitable criterion that specifies whether, and/or to what extent, the (prospect) transmission rate adjustment can accommodate the upcoming communication interruption (e.g., provide a time duration for the upcoming communication interruption while maintaining acceptable service quality). Alternatively or additionally, the accommodation criterion may specify whether, and/or to what extent, a transmission rate adjustment is currently possible for the service session (e.g., if it is possible to lower the service quality and/or if communication resources needed for the rate adjustment are available).

In some embodiments, another example method is provided for a radio access network control node operating in a communication network having an associated user device, wherein the user device has an ongoing application service session with an application server via the communication network. This example method proceeds directly from a step corresponding to step 110 to a step corresponding to step 160, and steps corresponding to steps 120, 130, 140, 150 are not present.

One approach to enable cancellation of measurement gaps for a user device having an ongoing application service session (e.g., for a latency sensitive service) is to configure the network to move other user devices to be served on other frequency bands, particularly when there is a cell overload. Thereby, the user device with the latency sensitive service does not need to perform measurements for load balancing (measurements for mobility may still need to be performed, as applicable). This approach is similar to load balancing as known in the art, but is (further) based on differentiation related to services associated with user devices.

Thus, when the user device and one or more other user devices are served by a same cell, the method may further comprise causing handover of at least one of the other user devices when the cell has a load which exceeds a threshold value.

In any case, the method(s) may further comprise identifying that the application service session is for a service wherein a deviation between a latency requirement of the service and an internal latency performance of the communication network is bounded, as illustrated by optional step 105. The method(s) may be performed only for such application service sessions according to some embodiments.

Thus, in step 105, it is identified that a service is currently associated with a user device—the user device in turn being associated with (e.g., served by) the communication network—wherein the service has bounded deviation between a latency requirement of the service and an internal latency performance of the communication network.

That a service is associated with a user device may, for example, include that part of a service application (e.g., an application client) is running on the user device.

The service may be the type of service elaborated on above—a service which relates to the communication network such that the latency requirements enforced by the service on the communication between the end points are not impossible, but not easy either, to accommodate by the internal latency performance of the communication network. This type of service is also referred to herein as latency sensitive services. This type of relationship between the service and the communication network is referred to herein by specifying that the deviation between a latency requirement of the service and an internal latency performance of the communication network is bounded.

One example that substantiates the bounded deviation between the latency requirement of the service and the internal latency performance of the communication network is that a ratio between a latency requirement parameter value of the service and an internal latency performance parameter value of the communication network falls within a bounding range (e.g., does not exceed a bounding threshold). The bounding range may have any suitable value and/or may be dynamic or static.

Alternatively or additionally, one example that substantiates the bounded deviation between the latency requirement of the service and the internal latency performance of the communication network is that a latency requirement parameter value of the service and an internal latency performance parameter value of the communication network are in a same order of magnitude. For example, the same order of magnitude may be defined as not deviating more than a factor, e.g., 2, 5, or 10.

Alternatively or additionally, one example that substantiates the bounded deviation between the latency requirement of the service and the internal latency performance of the communication network is that a latency requirement parameter value of the service and an internal latency performance parameter value of the communication network are equal.

Alternatively or additionally, one example that substantiates the bounded deviation between the latency requirement of the service and the internal latency performance of the communication network is that a required end-to-end round-trip-time of the service falls within a time range specified relative an internal round-trip-time of the communication network.

The latency requirement parameter may, for example, refer to one or more of: latency variation, latency average, probability for latencies above a threshold value, maximum latency, or any other suitable latency metric. The internal latency performance parameter may, for example, be a corresponding parameter of the communication network (i.e., latency variation, latency average, probability for latencies above a threshold value, maximum latency, or any other suitable latency metric).

For 3GPP-based communication networks, the service might, for example, be a service which has a maximum allowable latency which is lower than that of mobile broadband (MBB) services and/or higher than that of ultra-reliable low latency communication (URLLC) services; or correspondingly for any other suitable latency requirement parameter.

The identification in step 105, that a service with bounded deviation between the latency requirement of the service and the internal latency performance of the communication network is currently associated with a user device, may be performed in any suitable way. Some illustrative examples include detecting that a service class identifier is indicative of the service, detecting that a bearer dedicated for low latency requirements is assigned for the service, detecting that single network slice selection assistance information (S-NSSAI) is indicative of the service, and/or determining that a traffic pattern of the service matches a latency sensitive traffic pattern.

As indicated above, some typical communication networks are dimensioned and configured to provide service for MBB traffic. Although latency is considered in MBB-oriented networks—especially in relation to Transmission Control Protocol (TCP) throughput and ramp-up times—predictable latency is typically not required, since timing requirements in human-machine interaction for, e.g., web-browsing or (non-real-time) video streaming is quite relaxed and large latency variations may be hidden with large buffers.

Latency sensitive services on the other hand can typically not function well with large buffers due to the nature of the applications (e.g., quick reaction required in gaming or autonomous driving). This means that any latency spike (e.g., intermittent long packet delays) may have a negative impact on the application experience. Some work has been done (e.g., in Third Generation Partnership Project, 3GPP, standards) with an aim to reduce the overall latency. However, such work has generally not addressed variations in latency. The configuration parameters are typically rather tuned and set to optimize resource utilization and network capacity; satisfying MBB traffic but not meeting requirements for latency sensitive services.

Many latency sensitive service use cases do not have extreme requirements regarding low latency, and can cope quite well with latency variations as long as they are predictable and not too large. This type of latency behaviour (bounded and predictable) is not so important for MBB traffic performance and has generally not been considered in network configuration or methods used for data transfer. Contrarily, many methods and protocols are typically designed and configured to guarantee data delivery; achieved using retransmission mechanisms on different levels to minimize packet loss, which mechanisms may imply sudden latency spikes due to a halted data flow.

A general aim of some embodiments presented herein (e.g., the method 100 as described in connection with FIG. 3A) is to provide approaches to accommodate latency sensitive services in MBB-oriented communication networks. Particularly, this may be achieved by approaches for handling of communication interruptions.

To handle User Equipment (UE) mobility and/or network load balancing, the network typically requests that UEs perform neighbor cell measurements. The neighbor cell measurements may be intra-band (performed for a frequency in the same band as the frequency currently used for communication) or inter-band (performed for a frequency in another band than the frequency currently used for communication). In the latter case, the UE may need to interrupt data communication on the serving cell frequency and tune its radio to the frequency of another cell; in another band. To facilitate this procedure, the network may create measurement gaps for the serving cell to enable the UE measurements on a different frequency.

The UE measurement reports are used by the mobility control and/or load balancing function(s) of the network for, e.g., taking UE handover decisions. Neighbor cell measurements (at least inter-band) and handover each implies a communication interruption (e.g., due to an interrupt in the connection), which typically affects latency sensitive services.

To reduce the number of handovers and/or the number of neighbor cell measurements, the network may use specific settings for measurements and/or handover decisions in relation to UEs with latency sensitive services. However, there may still be scenarios where measurements and/or handover need to be performed to maintain connectivity. Some embodiments presented herein (e.g., the method 100 as described in connection with FIG. 3A) provide approaches that are suitable for such scenarios.

Figure 3B:
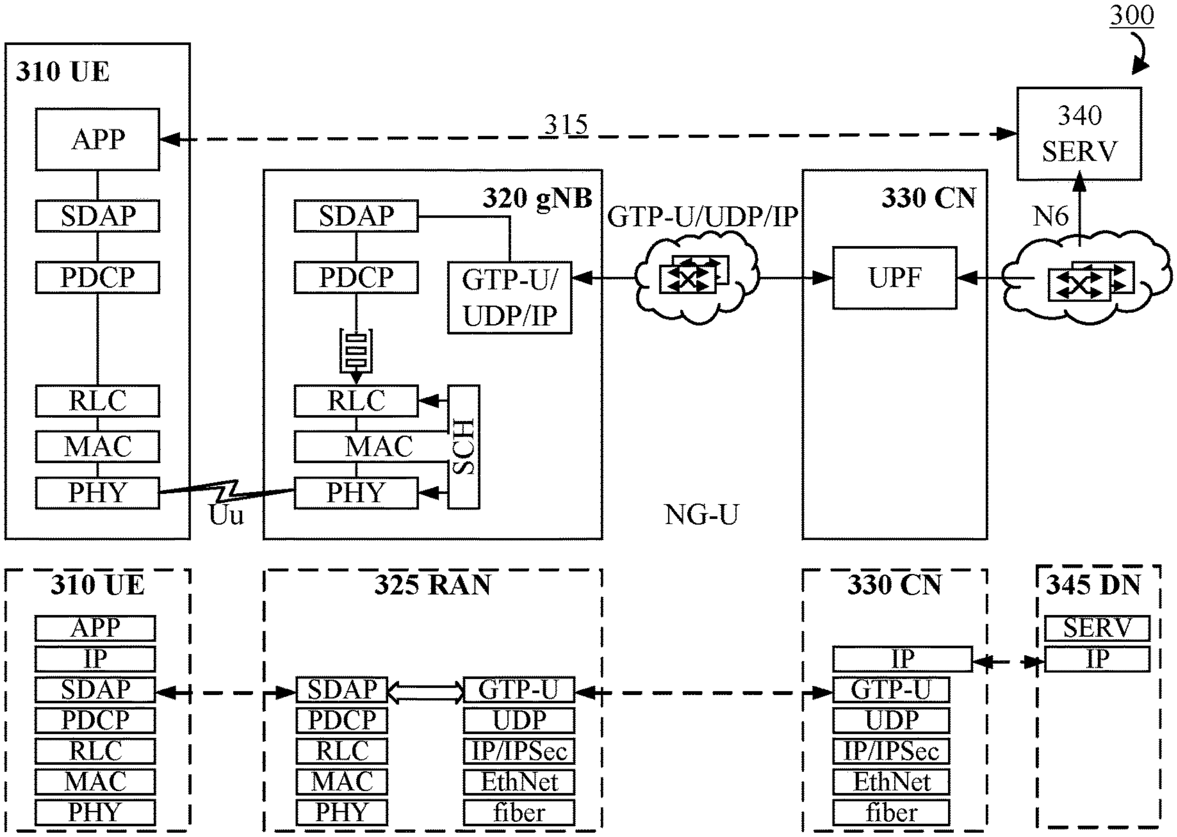
FIG. 3B is a schematic block diagram illustrating an example system model according to some embodiments.

FIG. 3B schematically illustrates an example system model 300 according to some embodiments, in which a latency sensitive service is using a fifth generation (5G) communication network for connectivity between an application (APP) of the user device and the application server. The user device is represented by a user equipment (UE) 310 and the application server is represented by a server (SERV) 340 residing in a data network (DN) 345.

Also exemplified in FIG. 3B are well known components related to communication stacks for the example system model 300; IP (Internet Protocol), SDAP (Service Data Adaptation Protocol), PDCP (Packet Data Convergence Protocol), RLC (Radio Link Control), MAC (Medium Access Control), PHY (PHYsical layer), SCH (SCHeduler), GTP-U (General Packet Radio Service, GPRS, Tunneling Protocol-User plane), UDP (User Datagram Protocol), UPF (User Plane Function), IP/IPSec (IP Security), and EthNet (Ethernet).

As illustrated in FIG. 3B, there is a wireless connection (Uu) between the UE and a radio access node (represented by a gNB 320) in the Radio Access Network (RAN) 325, and a fiber backhaul link (NG-U; user plane interface between Next Generation Radio Access Network, NG-RAN, and Fifth Generation Core, 5GC) between the gNB and the 5G Core Network (CN) 330 which may pass a network of switches and routers. Similarly, the connection between the CN and the application server may be implemented by a fiber link (N6; reference point between UPF and data network) which may pass a network of switches and routers.

The application data communicated between the application of the UE 310 and the server 340 passes the core network and the radio access network as illustrated by 315 (e.g., using Internet Protocol, IP). For performance reasons, both the CN as well as the application server may be deployed near the RAN (Edge deployment) to minimize delays from switches and routers as well as propagation delays in the transport media due to long distance between RAN node and application server.

The protocol stacks in of FIG. 3B indicate IP connectivity between the UE application and the server, where the IP layer (together with some transport layer; such TCP or UDP) provides transport of data between the application end points.

Latency sensitive (e.g., real-time) services produce and consume data in a certain pace depending on type of service. From end-to-end latency point of view, the system must secure that the IP packets can be processed and delivered in a pace that fulfills the application level demands. An aim of some embodiments is to contribute to that requirement; particularly by handling of communication interruptions in the wireless connection between the user device and the radio access node.

According to some embodiments, the network sees to that the data flow is adjusted such that the latency requirements for the service can be fulfilled when communication interruptions (e.g., measurement gaps) occur for the serving radio link. Triggering of the functionality may depend on latency demands for a specific service data flow.

A coordination may be applied between inter-frequency measurement handling and latency sensitive data transfer functionality to avoid and/or reduce impact on latency sensitive services. In a first approach, a packet pacing rate is increased to create margins for the latency sensitive service, in which measurement gaps can be accommodated. In a second approach, a quality of the latency sensitive service is temporarily reduced (e.g., lowering a video frame rate) to create margins for the latency sensitive services, in which measurement gaps can be accommodated. In a third approach, inter-frequency measurements are not performed (e.g., the network is not scheduling any measurement gaps) for a UE with a latency sensitive service. Two or more of these first, second, and third approaches may be combined as suitable. The approaches may be applied per UE and/or may be activated (only) for applicable service types (e.g., latency sensitive services, services with a certain quality-of-service profile, and/or services using a certain dedicated bearer).

Thus, improved accommodation of latency sensitive services is enabled in multi-frequency deployments; e.g., by adapting the service based on network conditions and/or by avoiding inter-frequency operations for UEs with active latency sensitive services.

Figure 4:
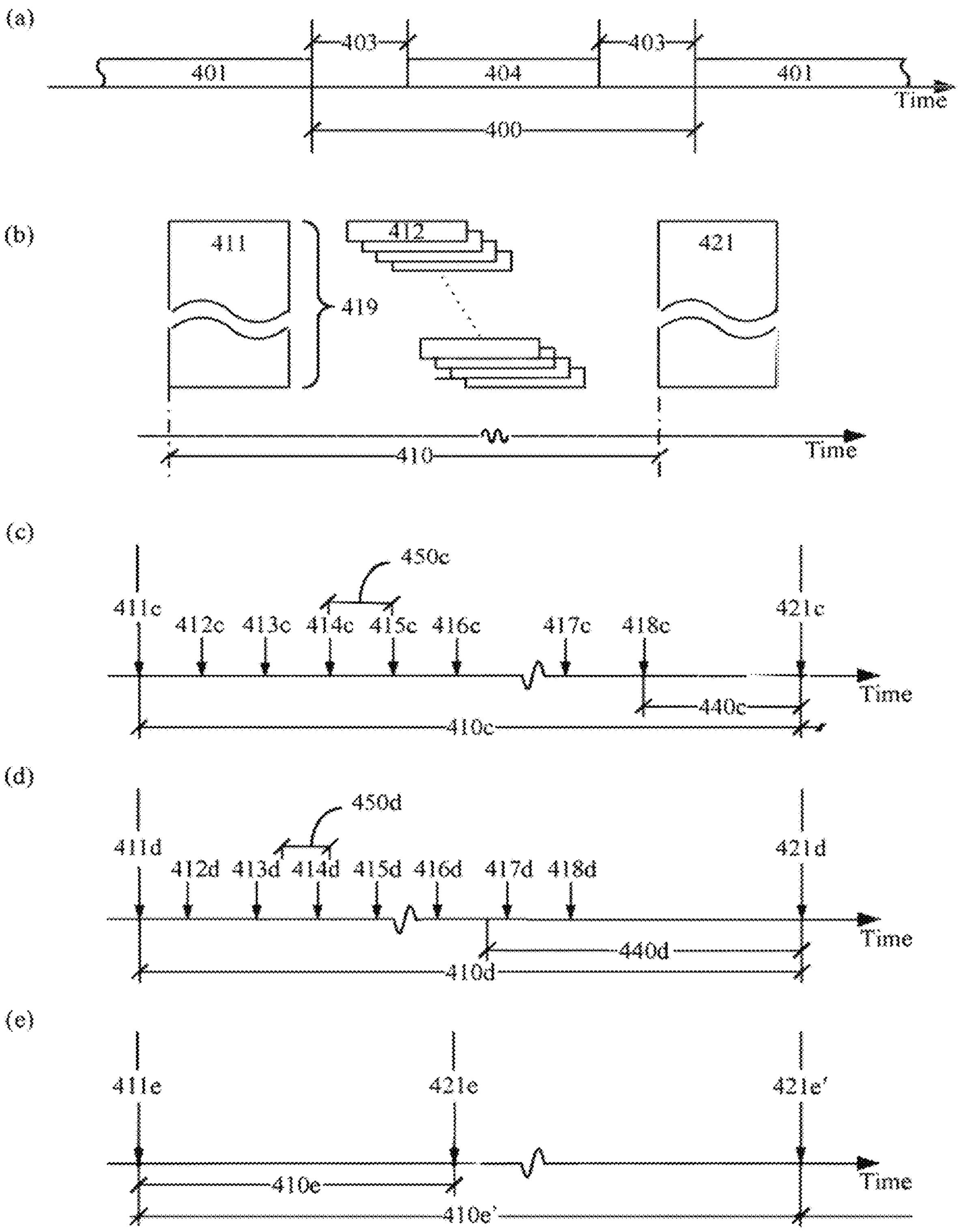
FIG. 4 is a collection of timing diagrams illustrating example approaches according to some embodiments.

FIG. 4 is a collection of timing diagrams (a)-(e) illustrating example approaches according to some embodiments.

Timing diagram (a) exemplifies a communication interruption in the form of a measurement gap 400. Before and after the measurement gap 400, communication is ongoing between the user device and the radio access node (e.g., using a serving cell with a first frequency) as illustrated by 401. During the measurement gap 400, the communication 401 between the user device and the radio access node is interrupted. After a transition time 403 (during which the user device can change receiver settings from the first frequency to a second frequency), the user device can perform measurements for the second frequency (e.g., inter-band measurements) as illustrated by 404. In the end of the measurement gap 400, another transition time 403 is provided (during which the user device can change receiver settings from the second frequency to the first frequency).

Timing diagram (b) exemplifies communication for an application service in the form of a real-time video streaming application, in which frames 411, 421 are to be consumed at a rate defined by an inter-frame time 410. A segmentation 419 of the video data of each frame 411 provides a plurality of (IP) packets 412; all of which should be communicated during the inter-frame time 410 for the corresponding frame 411. Typically, all packets need to be delivered to re-create the frame at the receiver. Also typically, the number of packets within a frame may be static/predetermined or dynamic/variable; depending on application specifics.

Generally, latency sensitive (real-time) services produce and consume data at a certain pace depending on type of service. Timing diagram (b) provides one example thereof. For example, the frame rate (i.e., the inter-frame time 410) may be specified by video quality.

As already implied, there is typically an end-to-end feedback loop between the application server and the application of the user device, which puts latency demands on all links of the connection. To avoid buffer overflow in transport network switches, the segmented IP packets from the video frames are sent at an even pace with a margin to digest short additional transport delays as well as to cater for potential retransmissions in the radio interface. Thus, there is typically some extra time available between the last IP packet and the beginning of the subsequent frame.

Timing diagram (c) exemplifies the communication of packets 412*c*, 413*c*, 414*c*, 415*c*, 416*c*, 417*c*, 418*c* (compare with 412) of a frame 411*c* (compare with 411) within an inter-frame time 410*c* (compare with 410). As can be seen, the plurality of packets are equally-distantly communicated within the inter-frame time 410*c* at a certain pace (an in-frame packet rate) defined by the time 450*c* between subsequent packets. When all packets have been communicated, there is a margin time 440*c* before the subsequent frame 421*c*.

Generally, the application service session may comprise a frame structure according to which a predetermined plurality of packets is transmitted within each frame. Timing diagram (c) provides one example thereof.

Timing diagram (d) exemplifies the communication of packets 412*d*, 413*d*, 414*d*, 415*d*, 416*d*, 417*d*, 418*d* (compare with 412 and 412*c*, 413*c*, 414*c*, 415*c*, 416*c*, 417*c*, 418*c*) of a frame 411*d* (compare with 411 and 411*c*) within an inter-frame time 410*d* (compare with 410 and 410*c*). As can be seen, the plurality of packets are equally-distantly communicated within the inter-frame time 410*d* at a certain pace (an in-frame packet rate) defined by the time 450*d* between subsequent packets. When all packets have been communicated, there is a margin time 440*d* before the subsequent frame 421*d*.

The in-frame packet rate is increased in timing diagram (d) compared to timing diagram (c), i.e., the time 450*d* between subsequent packets is shorter than the time 450*c* between subsequent packets. When the number of packets in a frame is fixed (i.e., static/predetermined), this results in that the margin time 440*d* becomes longer than the margin time 440*c*. Such an increase in margin time may enable accommodation of a communication interruption within the margin time 440*d*.

Generally, the temporary transmission rate adjustment may comprise increasing an in-frame packet rate. Timing diagram (d) provides one example thereof, and may be a representation of the first approach mentioned above.

Timing diagram (e) exemplifies variation of the inter-frame time 410*e*, 410*e*' (compare with 410, 410*c*, 410*d*) between frames. Thus, the inter-frame time for a frame 411*e* may be a relatively short (e.g., default) inter-frame time 410*e* before the subsequent frame 421*e*, or a relatively long inter-frame time 410*e*' before a subsequent frame 421*e*'. For example, the relatively short inter-frame time 410*e* may correspond to high service quality (e.g., high resolution video) and the relatively long inter-frame time 410*e*' may correspond to low service quality (e.g., low resolution video). Using the relatively long inter-frame time 410*e*' may enable accommodation of a communication interruption within the inter-frame time 410*e*'.

Generally, the temporary transmission rate adjustment may comprise decreasing a frame rate (which may in turn comprise decreasing a quality of the application service). Timing diagram (e) provides one example thereof, and may be a representation of the second approach mentioned above.

It should be noted that the approaches general presented in relation to timing diagrams (d) and (e) may be combined according to some embodiments.

Figure 5A:
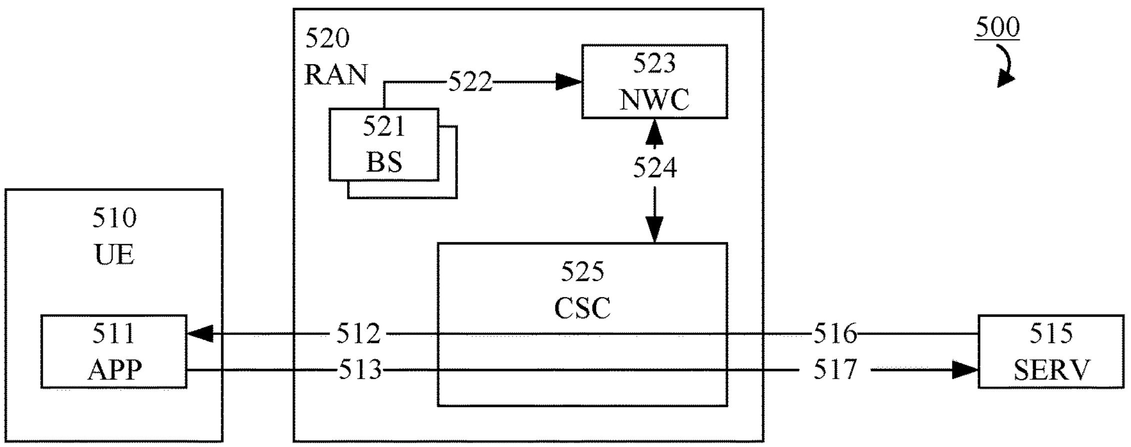
FIG. 5A is a schematic drawing illustrating an example system model according to some embodiments.
Figure 5B:
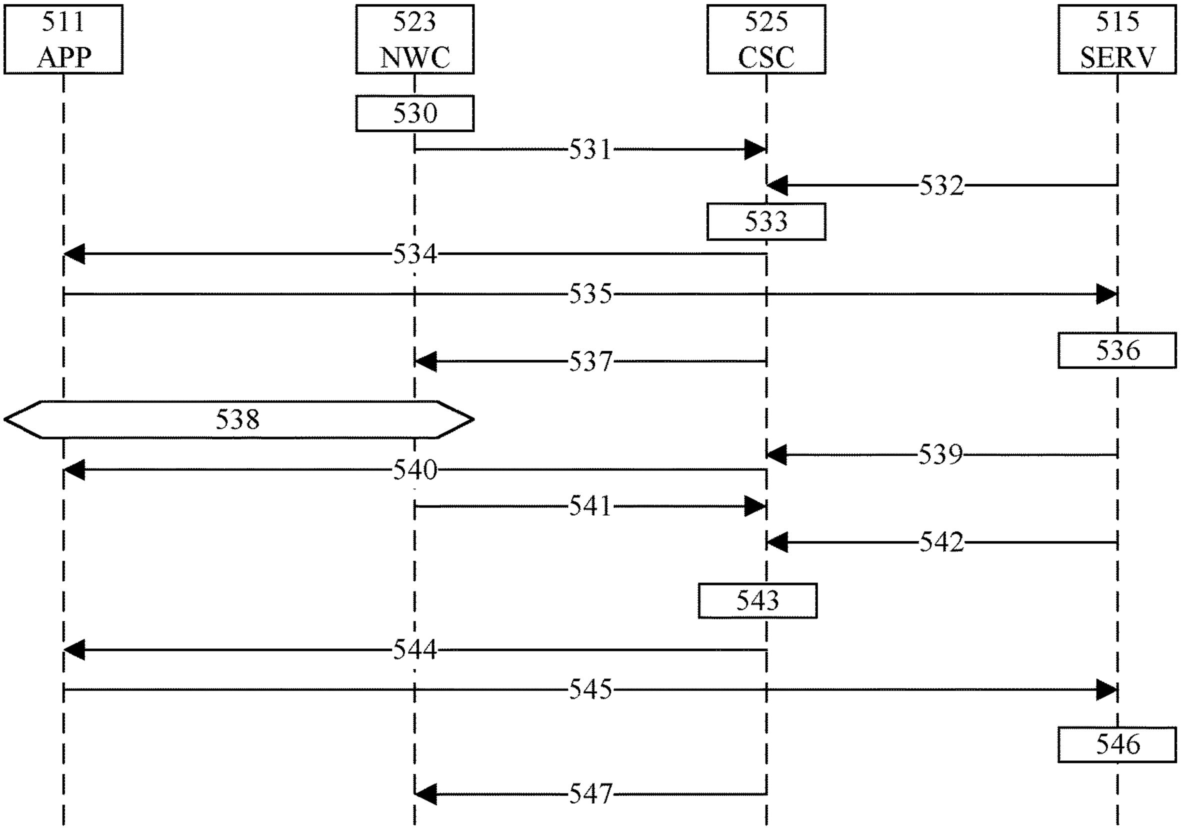
FIG. 5B is a signaling diagram illustrating example signaling according to some embodiments.

FIGS. 5A and 5B schematically illustrate an example system model 500 (FIG. 5A) and a corresponding example signaling diagram (FIG. 5B) according to some embodiments.

In analogy with what has been exemplified earlier herein, the system model 500 comprises an application (APP) 511 in a UE 510, with a connection to an application server (SERV) 515 established via a radio access network (RAN) 520.

In the RAN (e.g., in a radio access network control node, such as a base station or a central network node), there is a Congestion Supervision and Control (CSC) 525 function monitoring the data flow (e.g., queue build-up).

A network control (NWC) 523 function is also provided in the RAN. The NWC may have information regarding one or more of the following: cell level location for each UE, current active service categories for each UE (e.g., MBB or LSS), cell load, and other cell statistics. One or more of these types of information may be acquired from base station(s) (BS) 521 of the RAN as illustrated by 522.

The CSC and the NWC may be localized in the same, or different, network nodes. Furthermore, each of the CSC and the NWC may be localized in a single network node or may be distributed among two or more network nodes.

As illustrated by 524, the NWC may communicate with the CSC to request adjustments of the service data flow for a specific UE (as described previously; e.g., quality adaptation and/or modification of the packet pacing rate) when a triggering condition indicating an upcoming communication interruption is detected.

The CSC may communicate with the server and/or the UE (e.g., using embedded control markings in the packet header in the data flows of the service). Thus, a service data flow 516 from the server to the UE may become a modified service data flow 512 after passing the CSC, enabling the CSC to provide information or commands to the UE. Alternatively or additionally, a feedback data flow 513 from the UE to the server may become a modified feedback data flow 517 after passing the CSC, enabling the CSC to provide information or commands to the application server.

As illustrated by 530 of the signalling diagram of FIG. 5B, the NWC detects that there is an upcoming communication interruption (compare with step 110 of FIG. 3); e.g., identifies that inter-frequency measurements are required for a the LSS UE.

The NWC instructs 531 the CSC to cause a temporary transmission rate adjustment (e.g., an increase in packet pacing rate and/or a decrease in frame rate) for the service relating to the UE (compare with step 130 of FIG. 3).

When application service data 532 arrives at the CSC (compare with 516), the CSC adds a command indicative of the transmission rate adjustment to the data (e.g., by injecting a command in the packet header), as illustrated by 533 (compare with step 130 of FIG. 3). Then, the CSC forwards the application service data with the command 534 to the UE (compare with 512).

The UE identifies the command, the feedback 535 from the UE to the server (compare with 513, 517) indicates the transmission rate adjustment to the server, and the server adjusts the transmission rate (e.g., increases the packet pacing rate and/or a decreases the frame rate) for the UE application service accordingly, as illustrated by 536.

When the transmission rate adjustment is registered by the CSC it informs the NWC thereof as illustrated by 537. Then, the communication interruption can be allowed (compare with event 140 of FIG. 3; e.g., inter-frequency measurements 538 may be performed) while application service data 539, 540 uses the adjusted transmission rate.

After the communication interruption, the NWC instructs 541 the CSC to cause a transmission rate restoration (e.g., a decrease in packet pacing rate and/or an increase in frame rate, to a default mode) for the service relating to the UE (compare with step 150 of FIG. 3).

When application service data 542 arrives at the CSC (compare with 516), the CSC adds a command indicative of the transmission rate restoration to the data (e.g., by injecting a command to the packet header), as illustrated by 543 (compare with step 150 of FIG. 3). Then, the CSC forwards the application service data with the command 544 to the UE (compare with 512).

The UE identifies the command, the feedback 545 from the UE to the server (compare with 513, 517) indicates the transmission rate adjustment, and the server restores the transmission rate (e.g., decreases the packet pacing rate and/or increases the frame rate) for the UE application service accordingly, as illustrated by 546.

When the transmission rate restoration is registered by the CSC it informs the NWC thereof as illustrated by 547.

In a method for a user device having an ongoing application service session with an application server via a communication network, the signaling 534 may be seen as the user device receiving a user device adjustment command from the application server (here via the CSC) or a radio access network control node (e.g., comprising the CSC) operating in the communication network. Since the user device adjustment command 534 is indicative of the transmission rate adjustment, it is indirectly indicative of a trigger condition being met for the user device, the trigger condition indicating an upcoming communication interruption 538 in relation to the application service session.

In the method for a user device having an ongoing application service session with an application server via a communication network, the signaling 535 may be seen as the user device causing implementation of a temporary transmission rate adjustment 536 of the application service session by transmitting an application server adjustment command to the application server, wherein the temporary transmission rate adjustment provides a radio access channel margin accommodating the upcoming communication interruption.

In a method for an application server having an ongoing application service session with a user device via a communication network, the signaling 535 may be seen as the application server receiving an application server adjustment command from the user device (here via the CSC) or a radio access network control node (e.g., comprising the CSC) operating in the communication network. Since the application server adjustment command 535 indicates the transmission rate adjustment, it is indirectly indicative of a trigger condition being met for the user device, the trigger condition indicating an upcoming communication interruption 538 in relation to the application service session.

In the method for an application server having an ongoing application service session with a user device via a communication network, the step 536 may be seen as the application server implementing a temporary transmission rate adjustment of the application service session, wherein the temporary transmission rate adjustment provides a radio access channel margin accommodating the upcoming communication interruption.

Figure 5C:
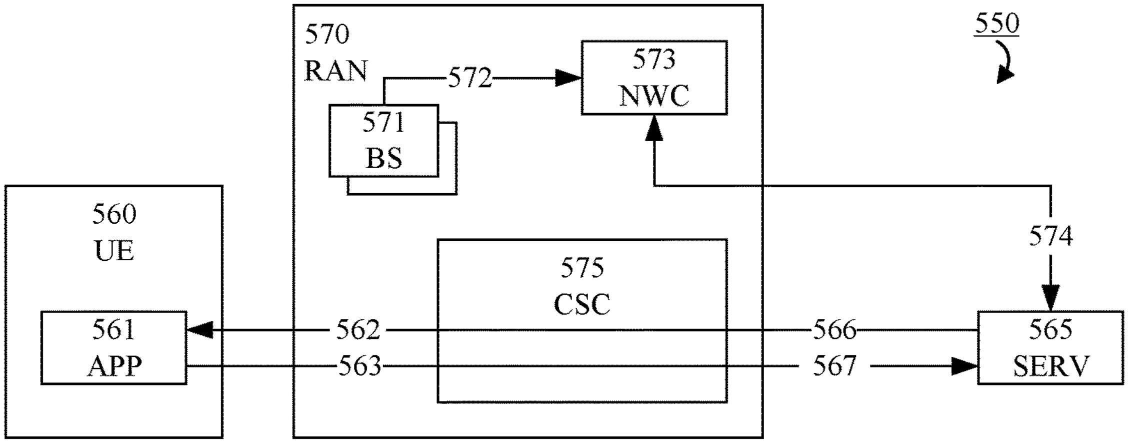
FIG. 5C is a schematic drawing illustrating an example system model according to some embodiments.
Figure 5D:
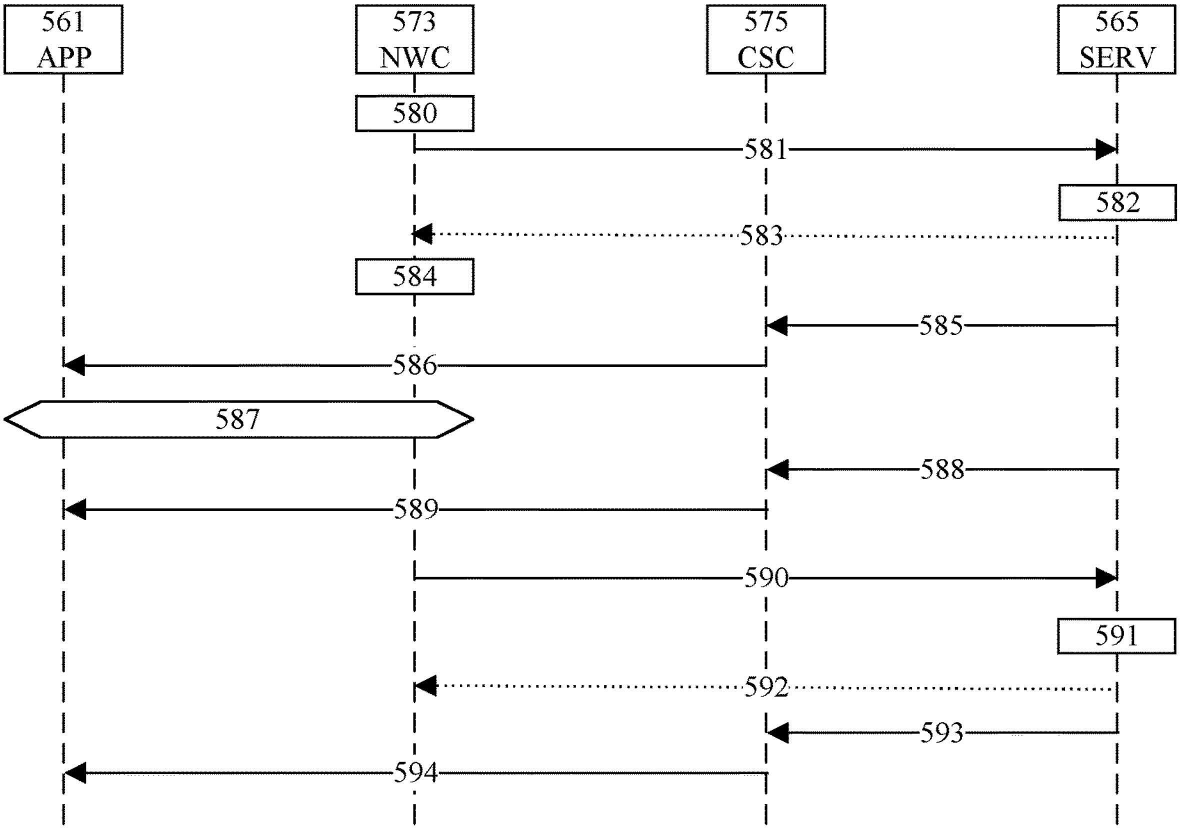
FIG. 5D is a signaling diagram illustrating example signaling according to some embodiments.

FIGS. 5C and 5D schematically illustrates an example system model 550 (FIG. 5C) and a corresponding example signaling diagram (FIG. 5D) according to some embodiments.

In analogy with what has been exemplified earlier herein, the system model 550 comprises an application (APP) 561 in a UE 560, with a connection to an application server (SERV) 565 established via a radio access network (RAN) 570.

In the RAN (e.g., in a radio access network control node, such as a base station or a central network node), there is a Congestion Supervision and Control (CSC) 575 function monitoring the data flow (e.g., queue build-up).

A network control (NWC) 573 function is also provided in the RAN. The NWC may have information regarding one or more of the following: cell level location for each UE, current active service categories for each UE (e.g., MBB or LSS), cell load, and other cell statistics. One or more of these types of information may be acquired from base station(s) (BS) 571 of the RAN as illustrated by 572.

The CSC and the NWC may be localized in the same, or different, network nodes. Furthermore, each of the CSC and the NWC may be localized in a single network node or may be distributed among two or more network nodes.

As illustrated by 574, the NWC may communicate directly with the application server 565 (e.g., via an application programming interface) API to request adjustments of the service data flow for a specific UE (as described previously; e.g., quality adaptation and/or modification of the packet pacing rate) when a triggering condition indicating an upcoming communication interruption is detected.

In these embodiments, the CSC may merely relay and monitor data between the server and the UE. Thus, a service data flow 566 from the server to the UE may be identical to a service data flow 562 after passing the CSC, and a feedback data flow 563 from the UE to the server may be identical to a feedback data flow 567 after passing the CSC.

As illustrated by 580 of the signalling diagram of FIG. 5D, the NWC detects that there is an upcoming communication interruption (compare with step 110 of FIG. 3); e.g., identifies that inter-frequency measurements are required for a the LSS UE.

The NWC instructs 581 the server to implement a temporary transmission rate adjustment (e.g., an increase in packet pacing rate and/or a decrease in frame rate) for the service relating to the UE (compare with step 130 of FIG. 3), and the server adjusts the transmission rate (e.g., increases the packet pacing rate and/or decreases the frame rate) for the UE application service accordingly, as illustrated by 582.

When the transmission rate adjustment is completed by the server, it may inform the NWC thereof as illustrated by 583. Then, the NWC determines 584 that the communication interruption can be allowed (compare with event 140 of FIG. 3; e.g., inter-frequency measurements 587 may be performed) while application service data 585, 586, 588, 589 uses the adjusted transmission rate.

After the communication interruption, the NWC instructs 590 the server to implement a transmission rate restoration (e.g., a decrease in packet pacing rate and/or an increase in frame rate, to a default mode) for the service relating to the UE (compare with step 150 of FIG. 3), and the server restores the transmission rate (e.g., decreases the packet pacing rate and/or increases the frame rate) for the UE application service accordingly, as illustrated by 591.

When the transmission rate restoration is completed by the server, it may inform the NWC thereof as illustrated by 592, and application service data 593, 594 uses the restored transmission rate.

In a method for an application server having an ongoing application service session with a user device via a communication network, the signaling 581 may be seen as the application server receiving an application server adjustment command from a radio access network control node (e.g., comprising the NWC) operating in the communication network. Since the application server adjustment command 581 indicates the transmission rate adjustment, it is indirectly indicative of a trigger condition being met for the user device, the trigger condition indicating an upcoming communication interruption 587 in relation to the application service session.

In the method for an application server having an ongoing application service session with a user device via a communication network, the step 582 may be seen as the application server implementing a temporary transmission rate adjustment of the application service session, wherein the temporary transmission rate adjustment provides a radio access channel margin accommodating the upcoming communication interruption.

Figure 6:
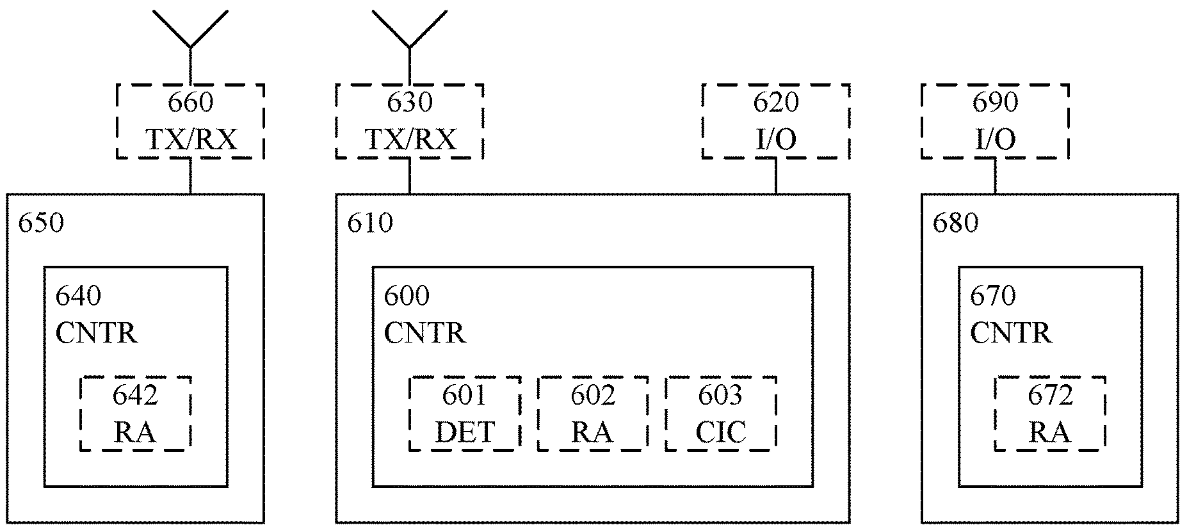
FIG. 6 is a collection of schematic block diagrams illustrating example apparatuses according to some embodiments.

FIG. 6 schematically illustrates three example apparatuses 610, 650, 680 according to some embodiments. The example arrangement are for a scenario with a radio access network control node operating in a communication network having an associated user device, wherein the user device has an ongoing application service session with an application server via the communication network.

The apparatus 610 may, for example, be comprisable (e.g., comprised) in a radio access network control node (e.g., a radio access node such as a base station, or a central processing node). Alternatively or additionally, the apparatus 610 may be configured to cause execution of one or more of the method steps described herein (e.g., in connection with any of FIGS. 3, 5A and 5B). The apparatus comprises a controller (CNTR; e.g., controlling circuitry or a control module) 600.

The controller 600 is configured to cause detection of that a trigger condition is met for the user device, the trigger condition indicating an upcoming communication interruption in relation to the application service session (compare with step 110 of FIG. 3).

To this end, the controller 600 may comprise, or be otherwise associated with (e.g., connected, or connectable, to) a detector (DET; e.g., detecting circuitry or a detection module) 601. The detector may be configured to detect that the trigger condition is met for the user device.

When the detection of that the trigger condition is met comprises reception of a signal indicative of the upcoming communication interruption, such reception may be via a wireless transceiver (TX/RX; e.g., transceiving circuitry or a transceiver module) 630 associated with (e.g., connected, or connectable, to) the controller and/or via a wired interface (I/O; e.g., interfacing circuitry or an interface module) 620 associated with (e.g., connected, or connectable, to) the controller.

When the detection of that the trigger condition is met comprises determination of a need for the upcoming communication interruption, such determination may be performed by a determiner (e.g., determination circuitry or a determination module) associated with the detector.

The controller 600 is also configured to cause implementation of a temporary transmission rate adjustment of the application service session, wherein the temporary transmission rate adjustment provides a radio access channel margin accommodating the upcoming communication interruption (compare with step 130 of FIG. 3). The controller 600 may be further configured to cause transmission rate restoration after the communication interruption (compare with step 150 of FIG. 3).

To this end, the controller 600 may comprise, or be otherwise associated with (e.g., connected, or connectable, to) a rate adjuster (RA; e.g., rate adjusting circuitry or a rate adjustment module) 602. The rate adjuster may be configured to implement the temporary transmission rate adjustment of the application service session, and possibly also configured to cause transmission rate restoration after the communication interruption.

When causing implementation of the temporary transmission rate adjustment comprises transmission of an adjustment command to the user device and/or the application server, such transmission may be via a wireless transceiver (TX/RX; e.g., transceiving circuitry or a transceiver module) 630 associated with (e.g., connected, or connectable, to) the controller and/or via a wired interface (I/O; e.g., interfacing circuitry or an interface module) 620 associated with (e.g., connected, or connectable, to) the controller.

The controller 600 may, additionally or alternatively, be configured to cause cancelling of the upcoming communication interruption as explained above; in response to that the trigger condition is met and/or in response to that an accommodation criterion is not met (compare with step 130 of FIG. 3).

To this end, the controller 600 may comprise, or be otherwise associated with (e.g., connected, or connectable, to) a communication interruption canceller (CIC; e.g., communication interruption cancelling circuitry or a communication interruption cancellation module) 603. The communication interruption canceller may be configured to cancel the upcoming communication interruption.

The apparatus 650 may, for example, be comprisable (e.g., comprised) in a user device. Alternatively or additionally, the apparatus 650 may be configured to cause execution of one or more of the method steps described herein (e.g., in connection with any of FIGS. 5A and 5B). The apparatus comprises a controller (CNTR; e.g., controlling circuitry or a control module) 640.

The controller 640 is configured to cause reception of a user device adjustment command from the application server or a radio access network control node operating in the communication network, wherein the user device adjustment command is indicative of a trigger condition being met for the user device, the trigger condition indicating an upcoming communication interruption in relation to the application service session.

To this end, the controller 640 may comprise, or be otherwise associated with (e.g., connected, or connectable, to) a receiver; illustrated in FIG. 6 as part of a wireless transceiver (TX/RX; e.g., transceiving circuitry or a transceiver module) 660. The receiver may be configured to receive the user device adjustment command.

The controller 640 is also configured to cause implementation of a temporary transmission rate adjustment of the application service session, wherein the temporary transmission rate adjustment provides a radio access channel margin accommodating the upcoming communication interruption.

To this end, the controller 640 may comprise, or be otherwise associated with (e.g., connected, or connectable, to) a rate adjuster (RA; e.g., rate adjusting circuitry or a rate adjustment module) 642. The rate adjuster may be configured to implement the temporary transmission rate adjustment of the application service session.

When causing implementation of the temporary transmission rate adjustment comprises transmission of an application server adjustment command to the application server, such transmission may be via a wireless transceiver (TX/RX; e.g., transceiving circuitry or a transceiver module) 660 associated with (e.g., connected, or connectable, to) the controller.

The apparatus 680 may, for example, be comprisable (e.g., comprised) in an application server. Alternatively or additionally, the apparatus 680 may be configured to cause execution of one or more of the method steps described herein (e.g., in connection with any of FIGS. 5A and 5B). The apparatus comprises a controller (CNTR; e.g., controlling circuitry or a control module) 670.

The controller 670 is configured to cause reception of an application server adjustment command from the user device or a radio access network control node operating in the communication network, wherein the application server adjustment command is indicative of a trigger condition being met for the user device, the trigger condition indicating an upcoming communication interruption in relation to the application service session.

To this end, the controller 670 may comprise, or be otherwise associated with (e.g., connected, or connectable, to) a receiver; illustrated in FIG. 6 as part of a wired interface (I/O; e.g., interfacing circuitry or an interface module) 690. The receiver may be configured to receive the application server adjustment command.

The controller 670 is also configured to cause implementation of a temporary transmission rate adjustment of the application service session, wherein the temporary transmission rate adjustment provides a radio access channel margin accommodating the upcoming communication interruption.

To this end, the controller 670 may comprise, or be otherwise associated with (e.g., connected, or connectable, to) a rate adjuster (RA; e.g., rate adjusting circuitry or a rate adjustment module) 672. The rate adjuster may be configured to implement the temporary transmission rate adjustment of the application service session.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device, a network node, or a server.

Embodiments may appear within an electronic apparatus (such as a wireless communication device, a network node, or a server) comprising arrangements, circuitry, and/or logic according to any of the embodiments described herein. Alternatively or additionally, an electronic apparatus (such as a wireless communication device, a network node, or a server) may be configured to perform methods according to any of the embodiments described herein.

Figure 7:
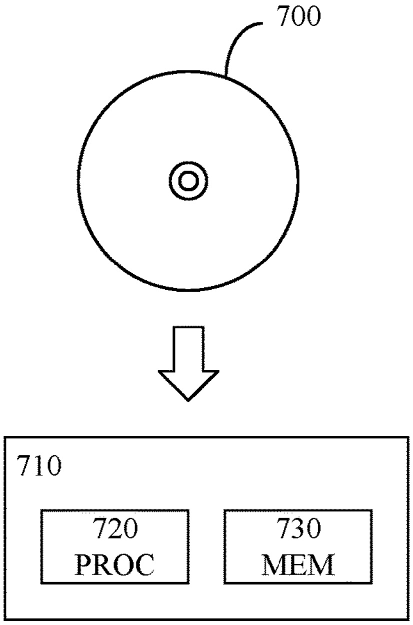
FIG. 7 is a schematic drawing illustrating an example computer readable medium according to some embodiments.

According to some embodiments, a computer program product comprises a tangible, or non-tangible, computer readable medium such as, for example a universal serial bus (USB) memory, a plug-in card, an embedded drive or a read only memory (ROM). FIG. 7 illustrates an example computer readable medium in the form of a compact disc (CD) ROM 700. The computer readable medium has stored thereon a computer program comprising program instructions. The computer program is loadable into a data processor (PROC; e.g., data processing circuitry or a data processing unit) 720, which may, for example, be comprised in a wireless communication device, a network node, or a server 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods illustrated in FIGS. 3, 5A, 5B, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

The invention claimed is:

1. A method for a radio access network control node operating in a communication network comprising a radio access network having an associated user device, wherein the user device has an ongoing application service session with an application server via the communication network, the method comprising:

detecting, by the radio access network control node, that a trigger condition is met for the user device, the trigger condition indicating an upcoming communication interruption in a wireless connection between the user device and a radio access node of the radio access network in relation to the application service session; and causing implementation of a temporary transmission rate adjustment of the application service session, wherein the temporary transmission rate adjustment provides a radio access channel margin accommodating the upcoming communication interruption;

wherein the application service session comprises a frame structure according to which a predetermined plurality of packets is transmitted within each frame, and wherein implementation of the temporary transmission rate adjustment comprises one or more of: decreasing a frame rate, and increasing an in-frame packet rate.

2. The method of claim 1, wherein decreasing the frame rate comprises decreasing a quality of the application service.

3. The method of claim 1, wherein the communication interruption is a measurement gap for the user device to perform inter-frequency measurements.

4. The method of claim 1, wherein detecting that the trigger condition is met comprises one or more of: receiving a signal indicative of the upcoming communication interruption, and determining a need for the upcoming communication interruption.

5. The method of claim 1, further comprising causing transmission rate restoration after the communication interruption.

6. The method of claim 1, wherein causing implementation of the temporary transmission rate adjustment comprises transmitting an adjustment command to the user device and/or the application server.

7. The method of claim 1, further comprising:

determining whether the transmission rate adjustment meets an accommodation criterion relative the upcoming communication interruption, wherein causing the transmission rate adjustment is responsive to the accommodation criterion being met; and cancelling the upcoming communication interruption when the accommodation criterion is not met.

8. The method of claim 1, wherein the user device and one or more other user devices are served by a same cell, the method further comprising causing handover of at least one of the other user devices when the cell has a load which exceeds a threshold value.

9. The method of claim 1, wherein the application service session is a real-time streaming application.

10. The method of claim 1, further comprising identifying that the application service session is for a service wherein a deviation between a latency requirement of the service and an internal latency performance of the communication network is bounded.

11. The method of claim 10, wherein identifying that the application service session—for a service wherein the deviation between the latency requirement of the service and the internal latency performance of the communication network is bounded—is currently associated with the user device comprises one or more of:

detecting that a service class identifier is indicative of the service;

detecting that a bearer dedicated for low latency requirements is assigned for the service; and determining that a traffic pattern of the service matches a latency sensitive traffic pattern.

12. The method of claim 10, wherein the bounded deviation between the latency requirement of the service and the internal latency performance of the communication network comprises one or more of:

a ratio between a latency requirement parameter value of the service and an internal latency performance parameter value of the communication network not exceeding a bounding threshold;

a latency requirement parameter value of the service and an internal latency performance parameter value of the communication network being in a same order of magnitude;

a latency requirement parameter value of the service and an internal latency performance parameter value of the communication network being equal; and a required end-to-end round-trip-time of the service falling within a time range specified relative an internal round-trip-time of the communication network.

13. The method of claim 10, wherein the service has a maximum allowable latency which is lower than that of mobile broadband, MBB, services and/or higher than that of ultra-reliable low latency communication, URLLC, services.

14. A method for a user device having an ongoing application service session with an application server via a communication network, the method comprising:

receiving a user device adjustment command from the application server or a radio access network control node operating in the communication network, wherein the user device adjustment command is indicative of a trigger condition being met for the user device, the trigger condition indicating an upcoming communication interruption in a wireless connection between the user device and a radio access node of the radio access network in relation to the application service session; and causing implementation of a temporary transmission rate adjustment of the application service session, wherein the temporary transmission rate adjustment provides a radio access channel margin accommodating the upcoming communication interruption;

wherein the application service session comprises a frame structure according to which a predetermined plurality of packets is transmitted within each frame, and wherein implementation of the temporary transmission rate adjustment comprises one or more of: decreasing a frame rate, and increasing an in-frame packet rate.

15. The method of claim 14, wherein causing implementation of the temporary transmission rate adjustment comprises transmitting an application server adjustment command to the application server.

16. A method for an application server having an ongoing application service session with a user device via a communication network including a radio access network, the method comprising:

receiving an application server adjustment command from the user device or a radio access network control node operating in the communication network, wherein the application server adjustment command is indicative of a trigger condition being met for the user device, the trigger condition indicating an upcoming communication interruption in a wireless connection between the user device and a radio access node of the radio access network in relation to the application service session; and implementing a temporary transmission rate adjustment of the application service session, wherein the temporary transmission rate adjustment provides a radio access channel margin accommodating the upcoming communication interruption;

wherein the application service session comprises a frame structure according to which a predetermined plurality of packets is transmitted within each frame, and wherein implementation of the temporary transmission rate adjustment comprises one or more of: decreasing a frame rate, and increasing an in-frame packet rate.

17. A computer program product comprising a non-transitory computer readable medium, having thereon a computer program comprising program instructions, the computer program being loadable into a data processing unit and configured to cause execution of the method according to claim 1 when the computer program is run by the data processing unit.

18. An apparatus for a radio access network control node operating in a communication network comprising a radio access network and having an associated user device, wherein the user device has an ongoing application service session with an application server via the communication network, the apparatus comprising controlling circuitry configured to cause:

detection of that a trigger condition is met for the user device, the trigger condition indicating an upcoming communication interruption in a wireless connection between the user device and a radio access node of the radio access network in relation to the application service session; and implementation of a temporary transmission rate adjustment of the application service session, wherein the temporary transmission rate adjustment provides a radio access channel margin accommodating the upcoming communication interruption;

wherein the application service session comprises a frame structure according to which a predetermined plurality of packets is transmitted within each frame, and wherein implementation of the temporary transmission rate adjustment comprises one or more of: decreasing a frame rate, and increasing an in-frame packet rate.

* * * * *